United States Patent
Cui et al.

(10) Patent No.: US 8,089,663 B2
(45) Date of Patent: Jan. 3, 2012

(54) DETACHABLE TRANSPARENT PLATE FOR SCAN HEAD ASSEMBLY

(75) Inventors: Chengwu Cui, Lexington, KY (US); Charles Brandon Langrel, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 1024 days.

(21) Appl. No.: 11/954,807

(22) Filed: Dec. 12, 2007

(65) Prior Publication Data

US 2009/0153920 A1 Jun. 18, 2009

(51) Int. Cl.
  *H04N 1/04* (2006.01)
(52) U.S. Cl. ........ 358/474; 358/498; 358/487; 358/406; 271/10.01
(58) Field of Classification Search .................. 358/461, 358/496, 497, 498, 504, 406, 506; 271/10.01
See application file for complete search history.

(56) References Cited

U.S. PATENT DOCUMENTS

| | | | | |
|---|---|---|---|---|
| 4,893,196 A * | 1/1990 | Koshiyouji et al. | ............ | 358/474 |
| 5,537,219 A * | 7/1996 | Morikawa et al. | ............ | 358/406 |
| 6,549,023 B2 * | 4/2003 | Kim | ............ | 356/123 |
| 7,528,996 B2 * | 5/2009 | Liu et al. | ............ | 358/461 |
| 7,667,877 B2 * | 2/2010 | Morimoto | ............ | 358/474 |
| 7,672,027 B2 * | 3/2010 | Nakayama et al. | ............ | 358/498 |
| 7,733,540 B2 * | 6/2010 | Moribe | ............ | 358/474 |
| 7,755,813 B2 * | 7/2010 | Nishikawa et al. | ............ | 358/497 |
| 2001/0026380 A1 * | 10/2001 | Imoto | ............ | 358/496 |
| 2002/0036809 A1 * | 3/2002 | Tohyama et al. | ............ | 358/498 |
| 2002/0149804 A1 * | 10/2002 | Mick et al. | ............ | 358/474 |
| 2004/0095619 A1 * | 5/2004 | Akaba | ............ | 358/509 |
| 2006/0203307 A1 * | 9/2006 | Morimoto | ............ | 358/498 |
| 2007/0058220 A1 * | 3/2007 | Sakakibara et al. | ............ | 358/498 |
| 2007/0223066 A1 * | 9/2007 | Liu et al. | ............ | 358/506 |

* cited by examiner

*Primary Examiner* — Negussie Worku

(57) ABSTRACT

A detachable transparent plate for a scan head assembly in a document scanning system that allows an operator to detach the transparent plate from the scan head assembly located above a media feed path to clean a top face of the transparent plate and easily reattach it to the scan head assembly. The scan head assembly has an optical system and a sealing member detachably mounted to a bottom end of the optical system. The transparent plate is received and supported by the sealing member and defines a portion of a bottom surface of the sealing member. The sealing member is detachable from the bottom end of the optical system to allow an operator access to the top face of the transparent plate of the sealing member for cleaning the top face of the transparent plate.

22 Claims, 4 Drawing Sheets

DETACHABLE TRANSPARENT PLATE FOR SCAN HEAD ASSEMBLY

TECHNICAL FIELD

The present invention relates generally to scan head assemblies for use in imaging devices, such as printers, multi-function printers (MFP's), all-in-ones, fax machines, copiers and scanners. In particular, it relates to a detachable transparent plate for a scan head assembly in a document scanning system that allows an operator to detach the transparent plate from the scan head assembly to clean an otherwise inaccessible top face of the transparent plate and easily reattach it to the scan head assembly.

BACKGROUND OF THE INVENTION

A document scanner is a device that optically scans images, text and the like from documents and other media and converts it to a digital image that can be replicated. Duplex document scanning is an important feature of imaging devices. Duplex document scanning involves scanning both sides of a media as opposed to simplex scanning where only one side of the media is scanned.

Generally, there are two types of duplex document scanning systems. The first type uses a recirculating media feed path and a single scan head assembly. The single scan head assembly is shared by both a flatbed scanner and an automatic document feeder (ADF). A flatbed scanner is usually composed of a transparent flat platen, which is used to receive the media being scanned. Under the platen is a light source, such as a xenon lamp, to illuminate the media being scanned. Further, the flatbed scanner has mirrors to direct reflected light from the media to an image sensor, such as a charge-coupled device (CCD) module to capture the image via a lens to focus the light.

The second type of duplex document scanning system uses a direct single pass media feed path with two scan head assemblies located on each side of the media feed path. In this arrangement, a first scan head assembly is shared by the flatbed scanner and the ADF for scanning the top or "face-up" side of the media. The first scan head assembly typically located below the media feed path is similar to the single scan head assembly discussed above for the flatbed scanner. A second scan head assembly typically located above the media feed path is used for scanning the bottom or "backside" of the media. The second scan head assembly or "backside" scan head assembly has similar components as the first scan head assembly, such as a light source, mirror, CCD module and lens. Instead of having a platen at a top surface of the scan head assembly, a transparent plate made of glass or other similar rigid material is located at a bottom part of the second scan head assembly. Due to this arrangement, a top face of the transparent plate collects contamination particles as a result of gravity forcing particles downward. Since the transparent plate is close to the document plane, any blocking of the optical path by contamination particles to the media surface causes false vertical lines in the scanned image either in black or in color depending on where the contamination particles are relative to the sensor arrays.

In practice, it is nearly impossible to prevent contamination particles from accumulating in the second scan head assembly. Even if the second scan head assembly was assembled under ideal conditions, aging and vibration creates contamination particles. Further, the media travels along the media feed path through the ADF, and it is difficult to prevent contamination particles, such as dust from entering the second scan head assembly. As a result, the top face of the transparent plate is often contaminated.

In addition, the transparent plate sometimes serves as a sealing component of a portion of a bottom part of the second scan head assembly. The positioning of the transparent plate is critical to the function of the second scan head assembly. Specifically, if the distance between the transparent plate and the CCD module in the second scan head assembly is varied, the quality of the scan of the media may be decreased, such as being out of focus. Accordingly, the transparent plate is typically designed and assembled in a manner that it cannot be detached by an operator.

Since the transparent plate cannot be detached by the operator, the operator cannot clean and eliminate the contamination particles on the top face of the transparent plate because it is inaccessible. In contrast, the bottom face of the transparent plate (and the platen of the first scan head) are not sealed and are easily accessible by the operator for cleaning purposes. The only way to remedy the contamination problem is to contact the manufacture of the imaging device to purchase a new replacement scan head assembly. Each time a scan head assembly is replaced, there are typically registration and alignment procedures that must be completed before the new assembly will function correctly. As a result, it is costly and time consuming to replace the scan head assembly.

Accordingly, the art of imaging devices has a need for allowing operators access to the top face of the transparent plate of the scan head assembly located above a media feed path for cleaning contamination particles in a cost-effective and timely manner while allowing operators to easily reattach the transparent plate to the scan head assembly without effecting optical position precision.

SUMMARY OF THE INVENTION

The above-mentioned and other problems become solved by applying the principles and teachings associated with the hereinafter described detachable transparent plate for scan head assembly for cleaning.

In a basic sense, the scan head assembly has an optical system and a transparent plate located below the optical system, but above a media feed path. The transparent plate seals a portion of a bottom side of the optical system and allows light from the optical system to pass through, so the image from the media can be scanned. Accordingly, it is critical that the transparent plate is free from contamination particles to prevent any blocking of the optical path, which decreases quality in the scanned image. However, due to the positioning of the transparent plate below the scan head assembly, gravity causes contamination particles to fall on the top face of the transparent plate. As a result, access is needed to the top face of the transparent plate to clean it.

In one embodiment, the invention teaches a scan head assembly for a document scanning system having a transparent plate detachably mounted to the optical system at a location above the media feed path. The transparent plate is configured to detach from a first side of the optical system while remaining attached to a second side of the optical system. The transparent plate pivots around a shaft in a direction away from the optical system to allow an operator access to a top face of the transparent plate to clean it. Further, the transparent plate may be easily reattached to the optical system by pivoting the transparent towards to the optical system.

In other aspects of the invention, a sealing member is positioned below the optical system and configured to receive and support the transparent plate. The sealing member has at least one projection mounted to the first end of the optical system. Further, the at least one projection is substantially C-shaped to mount to the optical system and to receive and pivot around a shaft. The sealing member may also have a latching mechanism to mount to the second end of the optical system. The latching mechanism may consist of a "snap-on" feature, such as a clip to easily detach and reattach to the optical system. Additionally, the sealing member may have at least one opening for receiving at least one screw or the like to mount to the optical system.

These and other embodiments, aspects, advantages, and features of the present invention will be set forth in the description which follows, and in part will become apparent to those of ordinary skill in the art by reference to the following description of exemplary embodiments of the invention and referenced drawings or by practice of the invention. The aspects, advantages, and features of the invention are realized and attained according to the following description and as particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE DRAWINGS

In the following detailed description of the drawings, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process or other changes may be made without departing from the scope of the present invention. The following detailed description is, therefore, not to be taken in a limiting sense, and the scope of the present invention is defined only by the appended claims and their equivalents. In accordance with the present invention, a detachable transparent plate for scan head assembly for cleaning is hereinafter described.

Figure 1:
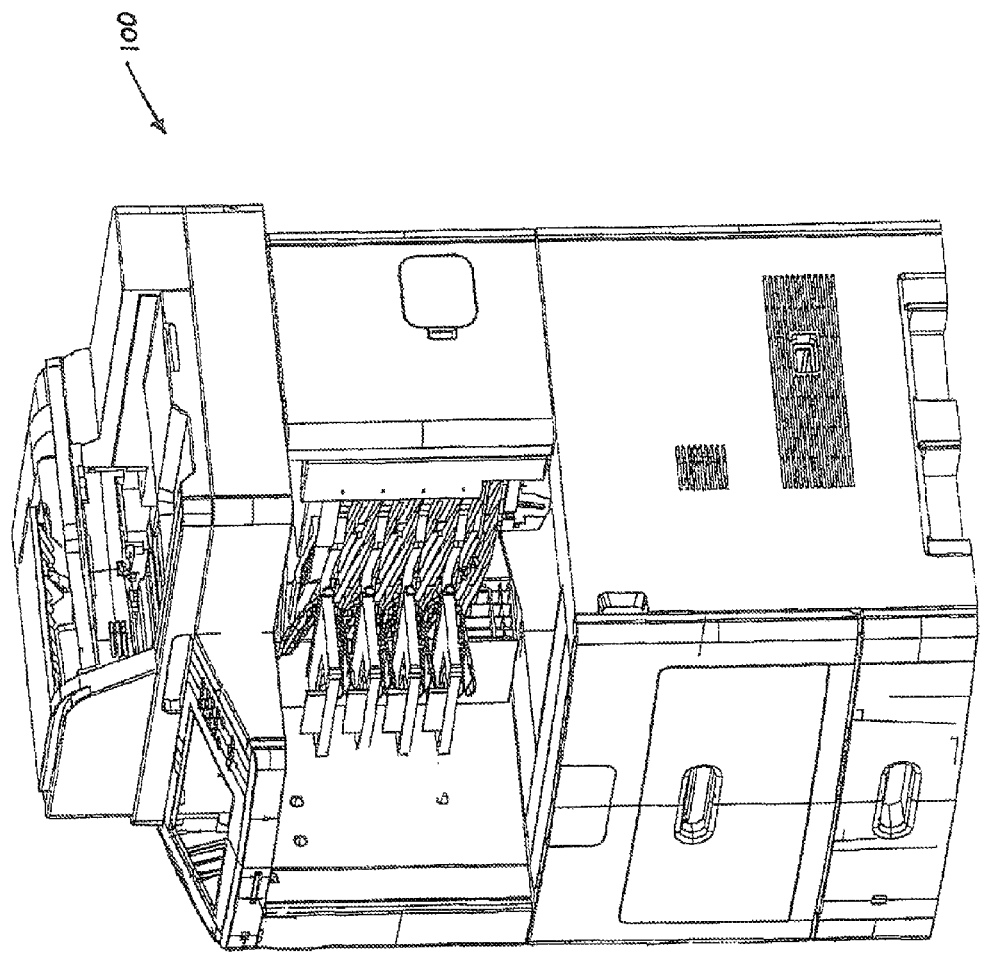
FIG. 1 is a perspective view in accordance with one embodiment of this invention of an exemplary document scanning system.
Figure 2:
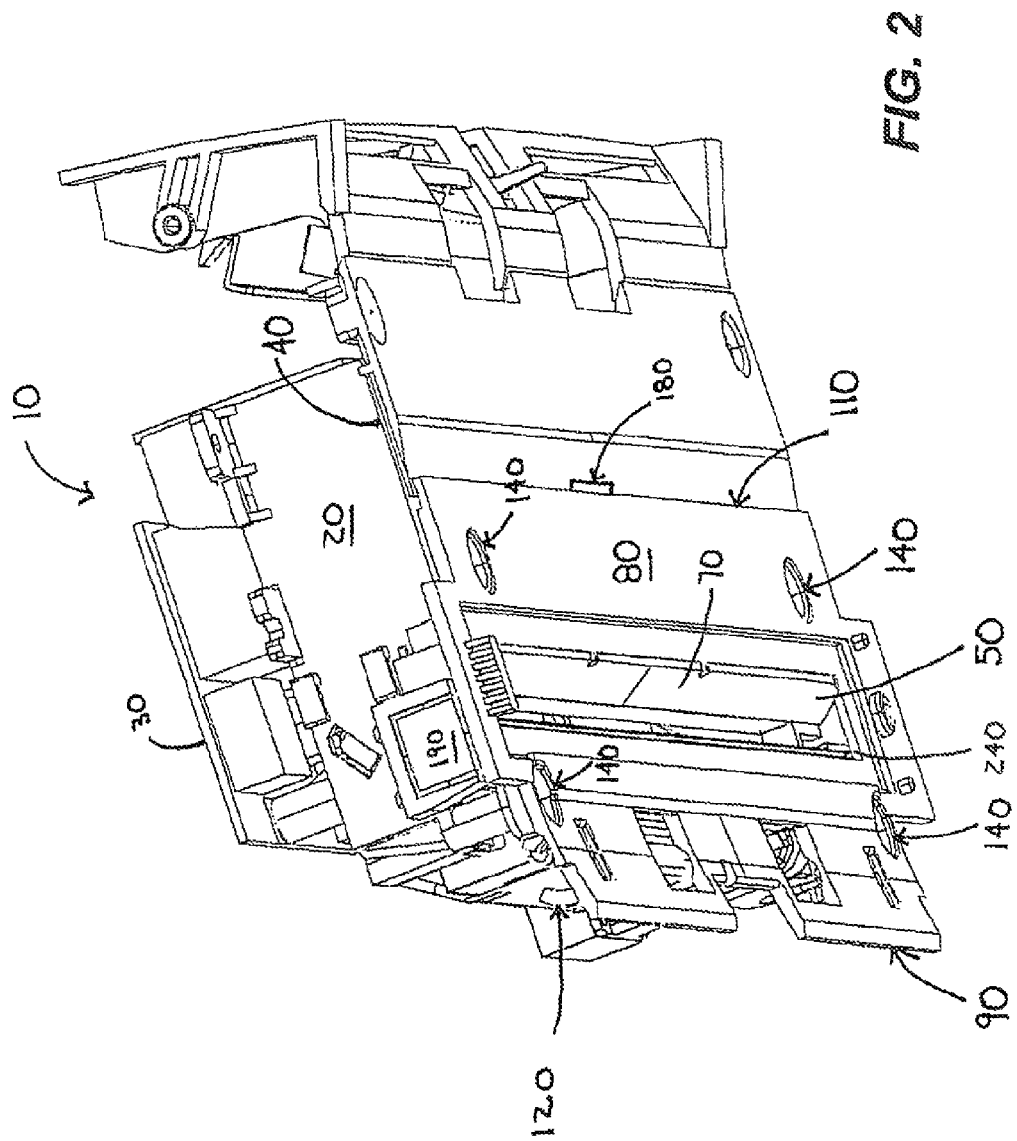
FIG. 2 is a perspective view in accordance with one embodiment of this invention of a scan head assembly with a transparent plate in a sealed position.
Figure 3:
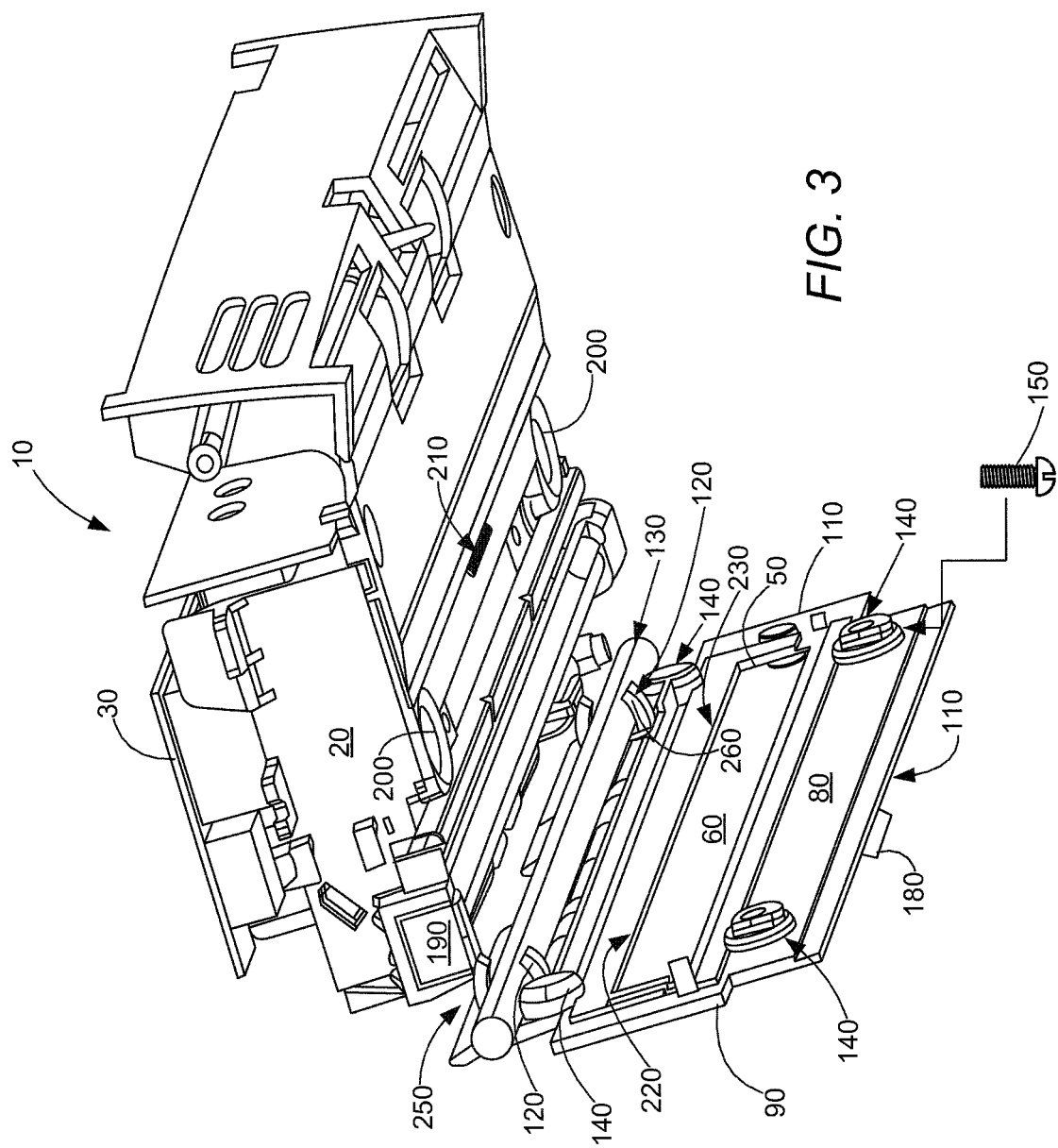
FIG. 3 is a perspective view in accordance with one embodiment of this invention of the scan head assembly with the transparent plate in an open position.

With reference to FIGS. 2 and 3, a detachable transparent plate 50 for a backside scan head assembly 10 for use in a document scanning system 100 (shown in FIG. 1). The backside scan head assembly 10 has an optical system 20 and a sealing member 80 detachably mounted to the optical system 20. The transparent plate 50 is received and supported by the sealing member 80 and defines a portion of a bottom surface 240 of the sealing member 80.

The sealing member 80 has a first end 90 and a second end 110. The first end 90 of the sealing member 80 has at least one projection 120 mounted to the bottom end 40 of the optical system 20. The at least one projection 120 is substantially C-shaped to mount to the optical system 20 and pivotally receive a shaft 130. The second end 110 of the sealing member 80 may have a latching mechanism 180 for mounting to the optical system 20. In another embodiment, the sealing member 80 may have at least one opening 140 for receiving at least one fastener 150 to mount to the optical system 20. The at least one fastener 150 may be a screw or the like.

During use, an operator detaches the second end 110 of the sealing member 80 from the bottom end 40 of the optical system 20. As will be discussed in more detail below, the second end 110 of the sealing member 80 may be detached by unscrewing the at least one fastener 150, by unlatching the latching mechanism 180 from the optical system 20 or both. Once the second end 110 of the sealing member 80 is detached, the first end 90 of the sealing member 80 pivots around the shaft 130 in a direction away from the optical system 20. As a result, the operator has access to an otherwise inaccessible top face 60 of the transparent plate 50 for cleaning purposes. Once the operator has cleaned the contamination particles from the top face 60 of the transparent plate 50, the sealing member 80 is easily reattached to the optical system 20 by pivoting the sealing member 80 around the shaft 130 in a direction towards to the optical system 20. The sealing member 80 is reattached to the optical system 20 by screwing the at least one fastener 150 to the optical system 20, connecting the latching mechanism 180 to the optical system 20 or both.

This invention offers a number of advantages not disclosed in the prior art. Specifically, the detachable transparent plate enables an operator to access the top face of the transparent plate for cleaning contamination particles formed due to gravity. As a result, it is not necessary to purchase a new scan head assembly and replace the contaminated one. Further, the transparent plate is easily reattached to the optical system without affecting optical position precision because the transparent plate is reattached in the exact same position. This is possible because the transparent plate is rigidly fixed in relation to the optical system by way of the latching mechanism and/or the at least one fastener. Accordingly, it reduces the time and expense associated with alignment and registration procedures required for installing a new scan head assembly.

The optical system 20 of the scan head assembly 10 is of a kind generally known in the art. Skilled artisans will appreciate that the optical system 20 has a light source, such as a xenon lamp, to illuminate a media being scanned. Further, the optical system 20 has mirrors to direct reflected light from the media to an image sensor, such as a charge-coupled device (CCD) module to capture an image via a lens to focus the light. On the bottom end 40 of the optical system 20, a foam-like element 190 compresses when the sealing member 80 is mounted to the optical system 20 to properly seal the optical system 20 and provide the necessary barrier for critical scan head optics. In one embodiment, the foam-like element 190 is substantially square-shaped and surrounds a periphery of a bottom portion of the optical system 20. The foam-like element 190 contacts the sealing member 80 when the scan head assembly 10 is in a sealed position.

In addition, the bottom end 40 of the optical system 20 has at least one slot 200 to facilitate mounting of the sealing member 80 to the optical system 20. In one embodiment, the at least one slot 200 may have at least one screw boss for receiving the at least one fastener 150, such as a screw from the sealing member 80. As shown in FIG. 3, four openings 140 are positioned on the sealing member 80 for receiving four fasteners 150. The fasteners 150 are attached through the openings 140 of the sealing member 80 to the corresponding four slots 200 in the optical system 20. In addition or alternatively, the optical system 20 may have a rod-like element 210 mounted thereto for attaching to the latching mechanism 180 of the sealing member 80. For example, the latching mechanism 180 may be a clip mounted to the sealing member 80, which connects to the rod-like element 210 to lock the sealing member 80 to the optical system 20. Preferably, the locating features in the scan head assembly 10 for attaching the sealing member 80 to the optical system 20 are designed to provide the correct location for the transparent plate 50, which is critical for the optical system 20 to capture the image correctly. The sealing member 80 may provide some flexibility in the scan head assembly 10, but the locating features ensure that proper orientation and correct alignment exist for the optical system to 20 perform properly.

The transparent plate 50 has the top face 60 and a bottom face 70. The transparent plate 50 is located between the first end 90 and the second end 110 of the sealing member 80. The transparent plate 50 is positioned in a recess 220 of the sealing member 80 and attached by using an adhesive, such as double-sided tape. The double-sided tape is positioned around an edge 230 of the transparent plate 50 to attach to the sealing member 80. When the sealing member 80 is mounted to the optical system 20, the top face 60 of the transparent plate is not accessible to an operator because it is enclosed. On the other hand, the bottom face 70 of the transparent plate 50 is accessible to the operator. Preferably, the transparent plate 50 is made of glass, but any transparent substantially rigid material may be used. The transparent plate 50 is substantially rectangular, but may be any shape corresponding to the shape of the recess 220 of the sealing member 80.

With reference to FIG. 3, two C-shaped projections 120 are attached to the second end 110 of the sealing member 80. The C-shaped projections attach at a first end 250 to the optical system 20 and pivotally receive the shaft 130 in the C-shape located between the first end 250 and a second end 260 of the projection 120. When the second end 110 of the sealing member 80 is detached from the optical system 20, the first end 90 of the sealing member rotates around the shaft 130 in a direction away from the optical system 20 providing the operator with access to the top face 60 of the transparent plate 50.

In one embodiment, the first end 90 of the sealing member 80 has two openings 140 for receiving fasteners 150, such as screws to mount to the optical system 20. Similarly, the second end 110 of the sealing member 90 has two openings 140 for receiving fasteners 150 to mount to the optical system 20. Further, the fasteners 150 are unscrewed from the optical system 20 to allow the first end 90 of the sealing member 80 to rotate around the shaft 130 and provide access to the top face 60 of the transparent plate 50. As discussed above, the latching mechanism 180, such as a clip may also be used for mounting to the optical system 20. The clip would "snap-on" to rod-like element 210 mounted on the optical system 20. In practice, the latching mechanism 180 may be used in conjunction with fasteners 150 to attach the sealing member 80 to the optical system 20 or the latching mechanism 180 may be substituted for the fasteners 150.

In another embodiment, the latching mechanism 180 and the shaft 130 may be omitted. In this manner, the sealing member 80 may be completely detached from the optical system 20 by unscrewing the fasteners 150 connecting the sealing member 80 to the optical system 20. After the sealing member 80 is completely detached, the operator may clean the top face 60 of the transparent plate 50. Subsequently, the operator may reattach the sealing member 80 to the optical system 20 by screwing the fasteners 150 to the optical system 20.

Figure 4:
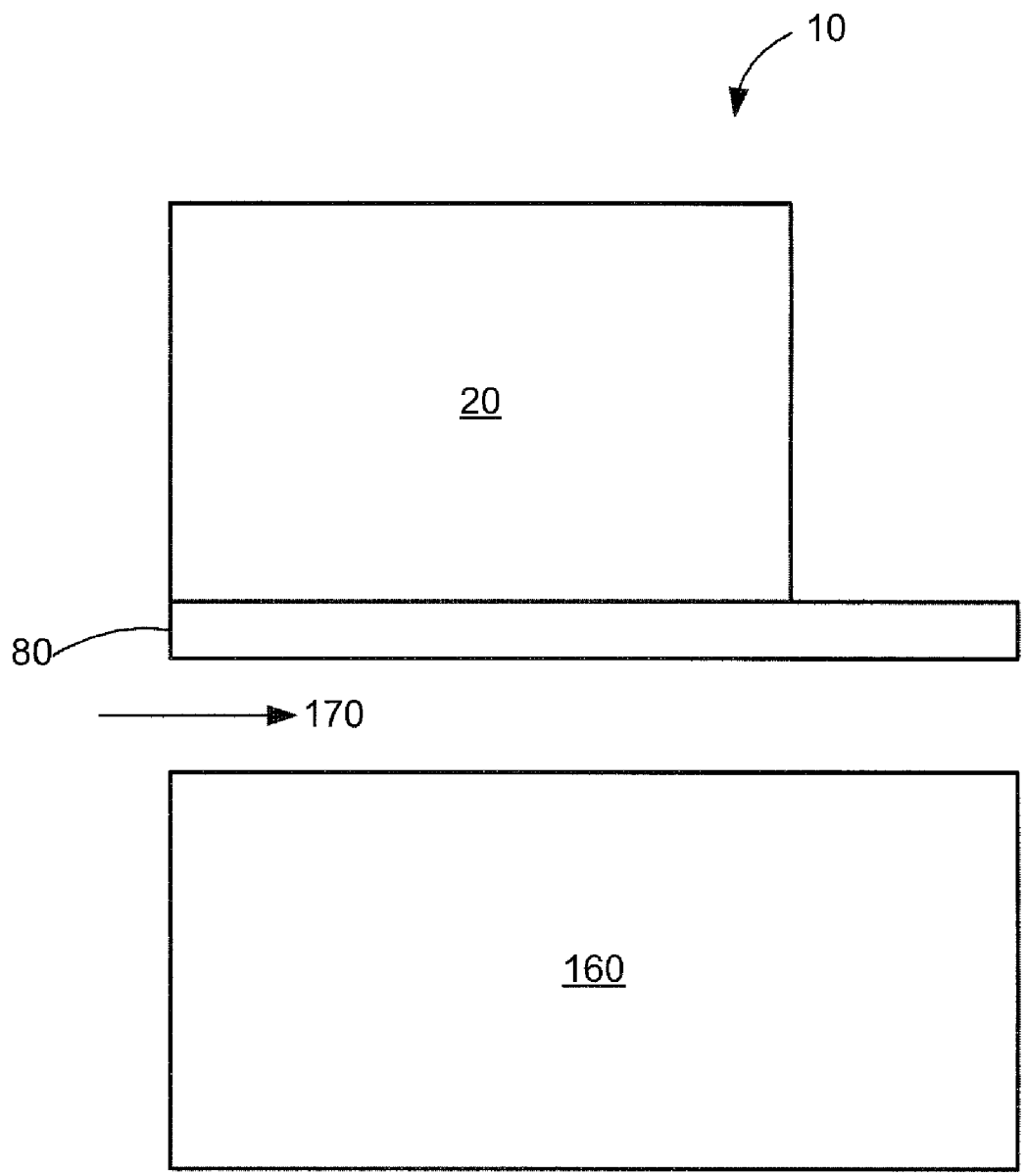
FIG. 4 is a partial side view in accordance with one embodiment of this invention of the document scanning system.

Turning to FIG. 4, a partial side view of the document scanning system 100 is shown. The backside scan head assembly 10 is located above a media feed path 170 (indicated by the direction of the arrow). A flatbed scan head assembly 160 is located below the media feed path 170 for scanning the top of "face-up" side of the media. The flatbed scan head assembly 160 is of a kind generally known in the art. Specifically, the flatbed scan head assembly 160 has a flat transparent platen covering a top surface. Under the transparent platen is a light source, such as xenon, to illuminate the media being scanned. Further, the flatbed scan head assembly 160 has a mirror to direct reflected light from the media to an image sensor, such as a CCD module to capture the image and a lens to focus the light. The media (not shown) is fed around the backside scan head assembly 20 in an approximate C-shape and then between the backside scan head assembly 20 and the flatbed scan head assembly 160.

In an alternative embodiment, the document scanning system 100 having a single top-sided scan head assembly located above the media feed path without a second scan head assembly located below the media feed path is contemplated. In this embodiment, the document scanning system may perform duplex scanning wherein a recirculating media feed path is used to scan both sides of the media or simplex scanning wherein the media feed path is C-shaped and only the top-side of the media is scanned. In simplex scanning, the media being fed should be properly orientated so that the correct side of the media (i.e., the side having the image) is scanned as known in the art.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A scan head assembly for use in a document scanning system for scanning a media from a location above a media feed path, comprising:
   an optical system having a top end and a bottom end; and
   a transparent plate having a top face and bottom face detachably mounted to the optical system;
   wherein the transparent plate is configured to detach from a first side of the optical system while remaining attached to a second side thereof, such that the transparent plate pivots about a shaft in a direction away from the optical system to allow access to the top face of the transparent plate.

2. The scan head assembly of claim 1, further comprising a sealing member configured to receive and support the transparent plate.

3. The scan head assembly of claim 2, wherein the sealing member is configured to remain attached to the optical system when the transparent plate is partially detached from the bottom end of the optical system.

4. The scan head assembly of claim 2, wherein said sealing member has a first end having at least one projection mounted to the optical system.

5. The scan head assembly of claim 4, wherein said at least one projection is substantially C-shaped for mounting to the optical system and pivotably receiving a shaft.

6. The scan head assembly of claim 5, wherein said sealing member has at least one opening for receiving at least one fastener to mount to the optical system, and has a second end having a latching mechanism for detachably mounting to the optical system.

7. The scan head assembly of claim 4, wherein said sealing member has a second end having a latching mechanism for detachably mounting to the optical system.

8. The scan head assembly of claim 2, wherein said sealing member has at least one opening for receiving at least one fastener to mount to the optical system.

9. The scan head assembly of claim 8, wherein said at least one fastener is a screw.

10. The scan head assembly of claim 1, wherein said transparent plate is glass.

11. A scan head assembly for use in a dual scan head duplex document scanning system for scanning a backside of a media from a location above a media feed path, comprising:
an optical system having a top end and a bottom end;
a sealing member having a first end and a second end detachably mounted to a bottom end of the optical system; and
a transparent plate having a top face and a bottom face supported by the sealing member and defining a portion of a bottom surface of the sealing member;
wherein the second end of the sealing member is configured to detach from a first side of the bottom end of the optical system while the first end remain attached to a second side thereof, such that the sealing member pivots about the second side in a direction away from the optical system.

12. The scan head assembly of claim 11, further comprising a shaft around which said sealing member rotates in a direction away from the optical system to allow access to the top face of the transparent plate.

13. The scan head assembly of claim 11, wherein said transparent plate is glass.

14. The scan head assembly of claim 11, wherein said first end of the sealing member has at least one projection mounted to the optical system.

15. The scan head assembly of claim 14, wherein said at least one projection is substantially C-shaped for mounting to the optical system and to pivotably receive a shaft.

16. The scan head assembly of claim 15, wherein said sealing member has at least one opening for receiving at least one fastener to mount to the optical system, said second end of the sealing member has a latching mechanism for detachably mounting to the optical system.

17. The scan head assembly of claim 11, wherein said second end of the sealing member has a latching mechanism for detachably mounting to the optical system.

18. The scan head assembly of claim 11, wherein said sealing member has at least one opening for receiving at least one fastener to mount to the optical system.

19. The scan head assembly of claim 18, wherein said optical system has at least one slot for receiving at least one fastener to connect the sealing member to the optical system.

20. A method for cleaning a top face of a transparent plate of a scan head assembly having an optical system in a document scanning system, comprising:
detaching the transparent plate from a first side of the optical system; and
pivoting the transparent plate away from the first side of the optical system to provide access for an operator during use to clean the top face of the transparent plate, the top face being inaccessible to the operator prior to detaching the transparent plate from the optical system.

21. The method of claim 20, wherein said detaching further includes unlatching the transparent plate from the optical system.

22. The method of claim 20, wherein said detaching further includes unscrewing the transparent plate from the optical system.

* * * * *